US007737974B2

(12) United States Patent
Mejdrich et al.

(10) Patent No.: US 7,737,974 B2
(45) Date of Patent: Jun. 15, 2010

(54) REALLOCATION OF SPATIAL INDEX TRAVERSAL BETWEEN PROCESSING ELEMENTS IN RESPONSE TO CHANGES IN RAY TRACING GRAPHICS WORKLOAD

(75) Inventors: Eric Oliver Mejdrich, Rochester, MN (US); Adam James Muff, Rochester, MN (US); Robert Allen Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 768 days.

(21) Appl. No.: 11/535,573

(22) Filed: Sep. 27, 2006

(65) Prior Publication Data

US 2008/0074417 A1   Mar. 27, 2008

(51) Int. Cl.
*G06T 15/50* (2006.01)
*G06T 15/00* (2006.01)

(52) U.S. Cl. ........................................ 345/426; 345/419
(58) Field of Classification Search ........................ None
See application file for complete search history.

(56) References Cited

U.S. PATENT DOCUMENTS

| | | | | | |
|---|---|---|---|---|---|
| 6,111,582 | A | * | 8/2000 | Jenkins | 345/421 |
| 7,002,571 | B2 | * | 2/2006 | Lake et al. | 345/420 |
| 7,012,604 | B1 | * | 3/2006 | Christie et al. | 345/426 |
| 7,164,420 | B2 | * | 1/2007 | Ard | 345/423 |
| 7,289,118 | B2 | * | 10/2007 | Schmittler et al. | 345/423 |
| 2003/0227455 | A1 | * | 12/2003 | Lake et al. | 345/421 |
| 2006/0066607 | A1 | * | 3/2006 | Schmittler et al. | 345/419 |
| 2007/0182732 | A1 | * | 8/2007 | Woop et al. | 345/420 |
| 2008/0043018 | A1 | * | 2/2008 | Keller et al. | 345/426 |

OTHER PUBLICATIONS

C. Müller, M. Strengert, and T. Ertl. Optimized Volume Raycasting for Graphics-Hardware-based Cluster Systems. In Eurographics Symposium on Parallel Graphics and Visualization (EGPGV06), pp. 59-66. Eurographics Association, May 2006.*
Snyder, J. and Lengyel, J. 1998. Visibility sorting and compositing without splitting for image layer decompositions. In Proceedings of the 25th Annual Conference on Computer Graphics and interactive Techniques SIGGRAPH '98. ACM, New York, NY, 219-230. DOI= http://doi.acm.org/10.1145/280814.280878.*

(Continued)

*Primary Examiner*—Daniel F Hajnik
(74) *Attorney, Agent, or Firm*—Patterson & Sheridan LLP

(57) ABSTRACT

Embodiments of the invention provide methods and apparatus for reallocating workload related to traversal of a ray through a spatial index. In a first operating state a workload manager may be experiencing a first or a normal workload. In the first operating state the workload manager may be responsible for traversing the entire spatial index and a vector throughput engine may be responsible for performing ray-primitive intersection tests. In an increased workload state the workload manager may experience an increased workload. In response to the increased workload the image processing system may partition the spatial index such that the workload manager may be responsible for traversing a first portion of the spatial index and the vector throughput engine may be responsible for traversing a second portion of the spatial index and for performing ray-primitive intersection tests.

6 Claims, 9 Drawing Sheets

OTHER PUBLICATIONS

S. Marchesin, C. Mongenet, J.-M. Dischler, Dynamic load balancing for parallel volume rendering, in: Eurographics Symposium on Parallel Graphics and Visualization, Eurographics Association, May 2006, pp. 51-58.*

Foley, T. and Sugerman, J. 2005. KD-tree acceleration structures for a GPU raytracer. In Proceedings of the ACM SIGGRAPH/ EUROGRAPHICS Conference on Graphics Hardware (Los Angeles, California, Jul. 30-31, 2005). HWWS '05. ACM, New York, NY, 15-22. DOI= http://doi.acm.org/10.1145/1071866.1071869.*

* cited by examiner

REALLOCATION OF SPATIAL INDEX TRAVERSAL BETWEEN PROCESSING ELEMENTS IN RESPONSE TO CHANGES IN RAY TRACING GRAPHICS WORKLOAD

BACKGROUND OF THE INVENTION

1. Field of the Invention

Embodiments of the invention generally relate to the field of computer processing.

2. Description of the Related Art

The process of rendering two-dimensional images from three-dimensional scenes is commonly referred to as image processing. As the modern computer industry evolves image processing evolves as well. One particular goal in the evolution of image processing is to make two-dimensional simulations or renditions of three-dimensional scenes as realistic as possible. One limitation of rendering realistic images is that modern monitors display images through the use of pixels.

A pixel is the smallest area of space which can be illuminated on a monitor. Most modern computer monitors will use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One technique for rendering a real world three-dimensional scene onto a two-dimensional monitor using pixels is called rasterization. Rasterization is the process of taking a two-dimensional image represented in vector format (mathematical representations of geometric objects within a scene) and converting the image into individual pixels for display on the monitor. Rasterization is effective at rendering graphics quickly and using relatively low amounts of computational power; however, rasterization suffers from some drawbacks. For example, rasterization often suffers from a lack of realism because it is not based on the physical properties of light, rather rasterization is based on the shape of three-dimensional geometric objects in a scene projected onto a two dimensional plane. Furthermore, the computational power required to render a scene with rasterization scales directly with an increase in the complexity of the scene to be rendered. As image processing becomes more realistic, rendered scenes also become more complex. Therefore, rasterization suffers as image processing evolves, because rasterization scales directly with complexity.

Another technique for rendering a real world three-dimensional scene onto a two-dimensional monitor using pixels is called ray tracing. The ray tracing technique traces the propagation of imaginary rays, rays which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two-dimensional display of the computer screen, the two dimensional synthesis of the three-dimensional scene can be displayed on the computer screen to the viewer.

Ray tracing typically renders real world three dimensional scenes with more realism than rasterization. This is partially due to the fact that ray tracing simulates how light travels and behaves in a real world environment, rather than simply projecting a three dimensional shape onto a two dimensional plane as is done with rasterization. Therefore, graphics rendered using ray tracing more accurately depict on a monitor what our eyes are accustomed to seeing in the real world.

Furthermore, ray tracing also handles increases in scene complexity better than rasterization as scenes become more complex. Ray tracing scales logarithmically with scene complexity. This is due to the fact that the same number of rays may be cast into a scene, even if the scene becomes more complex. Therefore, ray tracing does not suffer in terms of computational power requirements as scenes become more complex as rasterization does.

One major drawback of ray tracing is the large number of calculations, and thus processing power, required to render scenes. This leads to problems when fast rendering is needed. For example, when an image processing system is to render graphics for animation purposes such as in a game console. Due to the increased computational requirements for ray tracing it is difficult to render animation quickly enough to seem realistic (realistic animation is approximately twenty to twenty-four frames per second).

Therefore, there exists a need for more efficient techniques and devices to perform ray tracing.

SUMMARY OF THE INVENTION

Embodiments of the present invention generally provide methods and apparatus for performing ray tracing.

According to one embodiment of the invention, a method of ray tracing utilizing a spatial index having nodes defining bounded volumes of a three dimensional scene is provided. The method generally comprising: generating a ray into the scene; traversing the spatial index with a first processing element by taking branches from internal nodes until a leaf node is reached, wherein branches are taken based on whether the ray intersects bounding volumes defined by the nodes; determining with a second processing element if the ray intersects a primitive contained within the bounding volume corresponding to the leaf node; and in response to detecting an increase in workload associated with the first processing element, creating a boundary within the spatial index to partition the spatial index into a first portion and a second portion, wherein the first portion is on a first side of the boundary and the second portion is one a second side of the boundary, and wherein the first processing element will traverse the first portion of the spatial index until at least one of a leaf node or the boundary is reached, and the second processing element will traverse the second portion of the spatial index until a leaf node is reached, and upon reaching a leaf node, the second processing element will determine if a ray intersects a primitive contained within a bounding volume corresponding to the leaf node.

According to another embodiment of the invention, a method of partitioning a spatial index is provided. The method generally comprising: in a first operating state of an image processing system comprising at least a first processing element and a second processing element, traversing the spatial index with a first processing element by taking branches from internal nodes until a leaf node is reached, wherein branches are taken based on whether a ray intersects bounding volumes defined by the nodes, and determining, with a second processing element, if a ray intersects a primitive contained within the bounding volume defined by the leaf node; and in a second operating state of the image processing system, traversing a first portion of the spatial index with the first processing element, traversing a second portion of the spatial index with the second processing element and determining with the second processing element if the ray intersects a primitive contained within the leaf node.

According to another embodiment of the invention an image processing system is provided. The image processing system generally comprising: An image processing system, comprising: a spatial index; a first processing element; and a second processing element. Furthermore, the image processing system is generally configured to perform the steps comprising: in a first operating state of the image processing system, traversing the spatial index with a first processing element by taking branches from internal nodes until a leaf node is reached, wherein branches are taken based on whether the ray intersects bounding volumes defined by the nodes, and determining with a second processing element if a ray intersects a primitive contained within the bounding volume defined by the leaf node; and in a second operating state of the image processing system, traversing a first portion of the spatial index with a first processing element, traversing a second portion of the spatial index with a second processing element until a leaf node is reached, and determining with the second processing element if the ray intersects a primitive within the leaf node.

DETAILED DESCRIPTION OF THE PREFERRED EMBODIMENTS

Embodiments of the invention provide methods and apparatus for reallocating workload related to traversal through a spatial index (e.g., when tracing a ray through a three dimensional scene). According to one embodiment of the invention, in a first operating state of the image processing system, a first processing element (e.g., a workload manager) may be responsible for performing operations relating to traversing a ray through a spatial index. When the first type of processing element reaches a leaf node of the spatial index, the first processing element may send information defining the ray to a second type of processing element (e.g., a vector throughput engine). In the first operating state, the vector throughput engine may be responsible for performing ray-primitive intersections tests to determine if the ray intersects a primitive contained within the bounding volume corresponding to the leaf node.

According to embodiments of the invention, the image processing system may at some time determine that the workload manager is experiencing an increase in workload. In response to an increase in workload for the workload manager, the image processing system may reallocate the responsibility for traversal of portions of the spatial index. The reallocation may result in a second operating state of the image processing system, in which the workload manager traverses an initial portion of the spatial index and the vector throughput engine traverses the remainder of the spatial index and performs ray-primitive intersection tests. By reallocating the traversal responsibility of the spatial index, the workload presented to the workload manager may be reduced and consequently the time required to render an image from a three dimensional scene may be reduced.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

An Exemplary Processor Layout and Communications Network

Figure 1:
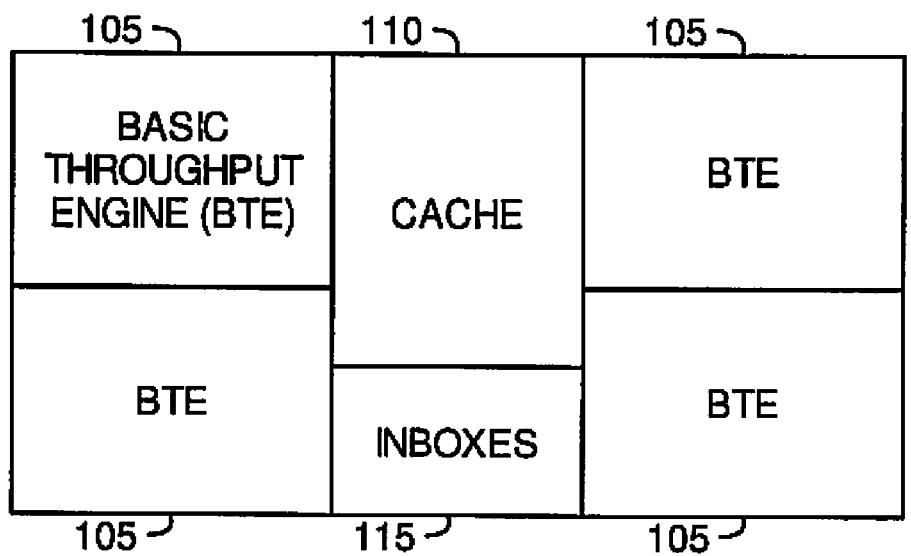
FIG. 1 illustrates a multiple core processing element, according to one embodiment of the invention.

FIG. 1 illustrates a multiple core processing element 100, according to one embodiment of the invention. The multiple core processing element 100 includes a plurality of basic throughput engines 105 (BTEs). A BTE 105 may contain a plurality of processing threads and a core cache (e.g., an L1 cache). The processing threads located within each BTE may have access to a shared multiple core processing element cache 110 (e.g., an L2 cache).

The BTEs 105 may also have access to a plurality of inboxes 115. The inboxes 115 may be memory mapped address space. The inboxes 115 may be mapped to the processing threads located within each of the BTEs 105. Each thread located within the BTEs may have a memory mapped inbox and access to all of the other memory mapped inboxes 115. The inboxes 115 make up a low latency and high bandwidth communications network used by the BTEs 105.

The BTEs may use the inboxes 115 as a network to communicate with each other and redistribute data processing work amongst the BTEs. For some embodiments, separate outboxes may be used in the communications network, for example, to receive the results of processing by BTEs 105. For other embodiments, inboxes 115 may also serve as outboxes, for example, with one BTE 105 writing the results of a processing function directly to the inbox of another BTE 105 that will use the results.

The aggregate performance of an image processing system may be tied to how well the BTEs can partition and redistribute work. The network of inboxes 115 may be used to collect and distribute work to other BTEs without corrupting the shared multiple core processing element cache 110 with BTE communication data packets that have no frame to frame coherency. An image processing system which can render many millions of triangles per frame may include many BTEs 105 connected in this manner.

In one embodiment of the invention, the threads of one BTE 105 may be assigned to a workload manager. An image processing system may use various software and hardware components to render a two dimensional image from a three dimensional scene. According to one embodiment of the invention, an image processing system may use a workload manager to traverse a spatial index with a ray issued by the image processing system. A spatial index, as described further below with regards to FIG. 4, may be implemented as a tree type data structure used to partition a relatively large three dimensional scene into smaller bounding volumes. An image processing system using a ray tracing methodology for image processing may use a spatial index to quickly determine ray-bounding volume intersections. In one embodiment of the invention, the workload manager may perform ray-bounding volume intersection tests by using the spatial index.

In one embodiment of the invention, other threads of the multiple core processing element BTEs 105 on the multiple core processing element 100 may be vector throughput engines. After a workload manager determines a ray-bounding volume intersection, the workload manager may issue (send), via the inboxes 115, the ray to one of a plurality of vector throughput engines. The vector throughput engines may then determine if the ray intersects a primitive contained within the bounding volume. The vector throughput engines may also perform operations relating to determining the color of the pixel through which the ray passed.

Figure 2:
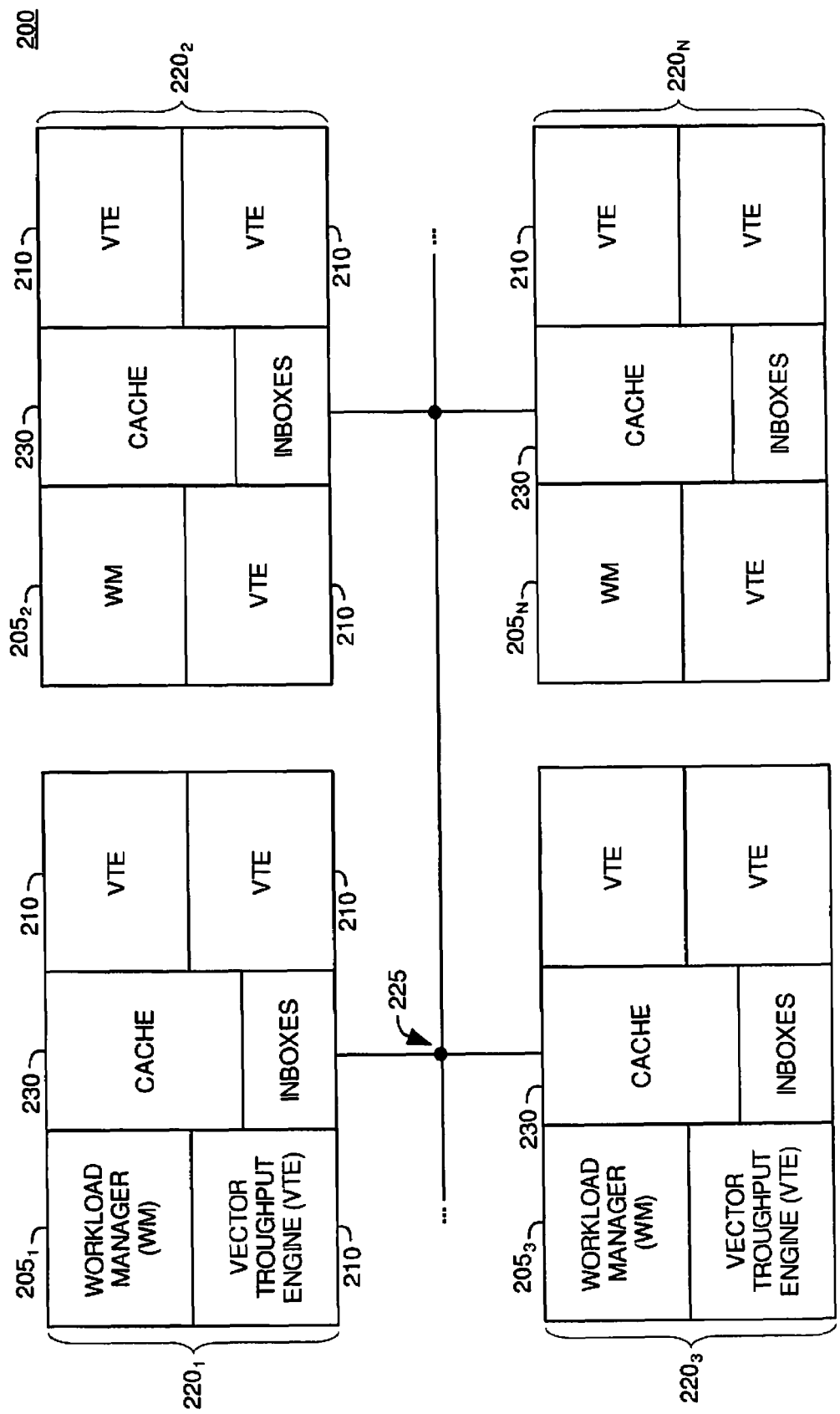
FIG. 2 illustrates multiple core processing element networks, according to embodiments of the invention.

FIG. 2 illustrates a network of multiple core processing elements 200, according to one embodiment of the invention. FIG. 2 also illustrates one embodiment of the invention where the threads of one of the BTEs of the multiple core processing element 100 is a workload manager 205. Each multiple core processing element $220_{1-N}$ in the network of multiple core processing elements 200 may contain one workload manager $205_{1-N}$, according to one embodiment of the invention. Each multiple core processing element $220_{1-N}$ in the network of multiple core processing elements 200 may also contain a plurality of vector throughput engines 210, according to one embodiment of the invention.

The workload managers $205_{1-N}$ may use a high speed bus 225 to communicate with other workload managers $205_{1-N}$ and/or vector throughput engines 210 of other multiple core processing elements $220_{1-N}$, according to one embodiment of the invention. Each of the vector throughput engines 210 may use the high speed bus 225 to communicate with other vector throughput engines 210 or the workload managers $205_{1-N}$. The workload manager processors 205 may use the high speed bus 225 to collect and distribute image processing related tasks to other workload managers $205_{1-N}$, and/or distribute tasks to other vector throughput engines 210. The use of a high speed bus 225 may allow the workload managers $205_{1-N}$ to communicate without affecting the caches 230 with data packets related to workload manager communications.

An Exemplary Three Dimensional Scene

Figure 3:
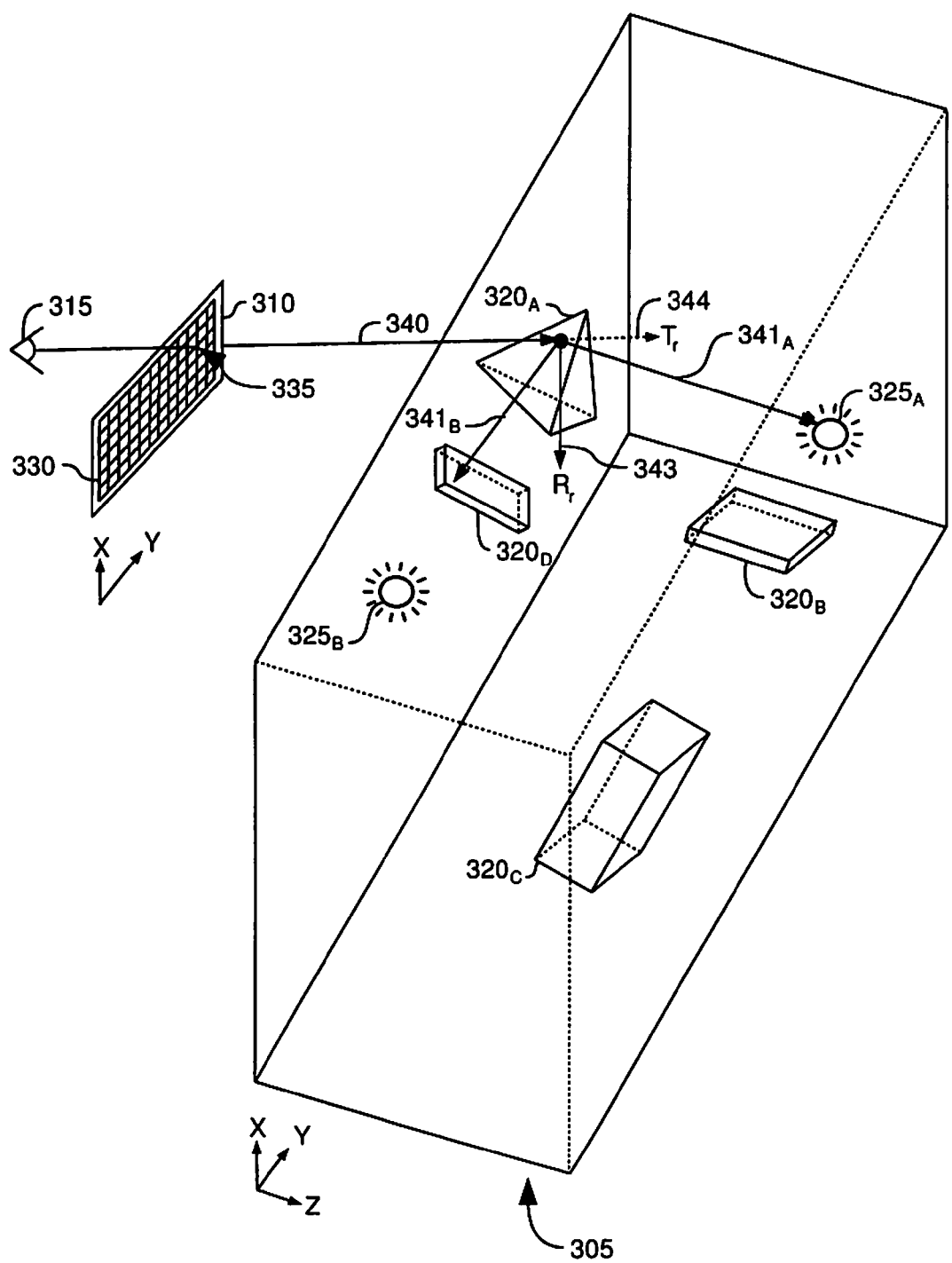
FIG. 3 is an exemplary three dimensional scene to be rendered by an image processing system, according to one embodiment of the invention.

FIG. 3 is an exemplary three dimensional scene 305 to be rendered by an image processing system. Within the three dimensional scene 305 may be objects 320. The objects 320 in FIG. 3 are of different geometric shapes. Although only four objects 320 are illustrated in FIG. 3, the number of objects in a typical three dimensional scene may be more or less. Commonly, three dimensional scenes will have many more objects than illustrated in FIG. 3.

As can be seen in FIG. 3 the objects are of varying geometric shape and size. For example, one object in FIG. 3 is a pyramid $320_A$. Other objects in FIG. 3 are boxes $320_{B-D}$. In many modern image processing systems objects are often broken up into smaller geometric shapes (e.g., squares, circles, triangles, etc.). The larger objects are then represented by a number of the smaller simple geometric shapes. These smaller geometric shapes are often referred to as primitives.

Also illustrated in the scene 305 are light sources $325_{A-B}$. The light sources may illuminate the objects 320 located within the scene 305. Furthermore, depending on the location of the light sources 325 and the objects 320 within the scene 305, the light sources may cause shadows to be cast onto objects within the scene 305.

The three dimensional scene 305 may be rendered into a two-dimensional picture by an image processing system. The image processing system may also cause the two-dimensional picture to be displayed on a monitor 310. The monitor 310 may use many pixels 330 of different colors to render the final two-dimensional picture.

One method used by image processing systems to render a three-dimensional scene 320 into a two dimensional picture is called ray tracing. Ray tracing is accomplished by the image processing system "issuing" or "shooting" rays from the perspective of a viewer 315 into the three-dimensional scene 320. The rays have properties and behavior similar to light rays.

One ray 340, that originates at the position of the viewer 315 and traverses through the three-dimensional scene 305, can be seen in FIG. 3. As the ray 340 traverses from the viewer 315 to the three-dimensional scene 305, the ray 340 passes through a plane where the final two-dimensional picture will be rendered by the image processing system. In FIG. 3 this plane is represented by the monitor 310. The point the ray 340 passes through the plane, or monitor 310, is represented by a pixel 335.

As briefly discussed earlier, most image processing systems use a grid 330 of thousands (if not millions) of pixels to render the final scene on the monitor 310. Each individual pixel may display a different color to render the final composite two-dimensional picture on the monitor 310. An image processing system using a ray tracing image processing methodology to render a two dimensional picture from a three-dimensional scene will calculate the colors that the issued ray or rays encounters in the three dimensional scene. The image processing scene will then assign the colors encountered by the ray to the pixel through which the ray passed on its way from the viewer to the three-dimensional scene.

The number of rays issued per pixel may vary. Some pixels may have many rays issued for a particular scene to be rendered. In which case the final color of the pixel is determined by the each color contribution from all of the rays that were issued for the pixel. Other pixels may only have a single ray issued to determine the resulting color of the pixel in the two-dimensional picture. Some pixels may not have any rays issued by the image processing system, in which case their color may be determined, approximated or assigned by algorithms within the image processing system.

To determine the final color of the pixel 335 in the two dimensional picture, the image processing system must determine if the ray 340 intersects an object within the scene. If the ray does not intersect an object within the scene it may be assigned a default background color (e.g., blue or black, representing the day or night sky). Conversely, as the ray 340 traverses through the three dimensional scene the ray 305 may strike objects. As the rays strike objects within the scene, the color of the object may be assigned to the pixel through which the ray passes. However, the color of the object must be determined before it is assigned to the pixel.

Many factors may contribute to the color of the object struck by the original ray 340. For example, light sources within the three dimensional scene may illuminate the object. Furthermore, physical properties of the object may contribute to the color of the object. For example, if the object is reflective or transparent, other non-light source objects may then contribute to the color of the object.

In order to determine the effects from other objects within the three dimensional scene, secondary rays may be issued from the point where the original ray 340 intersected the object. For example, shadow rays 341 may be issued to determine the contribution of light to the point where the original ray 340 intersected the object. If the object has translucent properties, the image processing system may issue a transmitted ray 344 to determine what color or light to be transmitted through the body of the object. If the object has reflective properties, the image processing system may issue a reflected ray to determine what color or light is reflected onto the object 320.

One type of secondary ray may be a shadow ray. Each shadow ray may be traced from the point of intersection of the original ray and the object, to a light source within the three-dimensional scene 305. If the ray reaches the light source without encountering another object before the ray reaches the light source, then the light source will illuminate the object struck by the original ray at the point where the original ray struck the object.

For example, shadow ray $341_A$ may be issued from the point where original ray 340 intersected the object $320_A$, and may traverse in a direction towards the light source $325_A$. The shadow ray $341_A$ reaches the light source $325_A$ without encountering any other objects 320 within the scene 305. Therefore, the light source $325_A$ will illuminate the object $320_A$ at the point where the original ray 340 intersected the object $320_A$.

Other shadow rays may have their path between the point where the original ray struck the object and the light source blocked by another object within the three-dimensional scene. If the object obstructing the path between the point on the object the original ray struck and the light source is opaque, then the light source will not illuminate the object at the point where the original ray struck the object. Thus, the light source may not contribute to the color of the original ray and consequently neither to the color of the pixel to be rendered in the two-dimensional picture. However, if the object is translucent or transparent, then the light source may illuminate the object at the point where the original ray struck the object.

For example, shadow ray $341_B$ may be issued from the point where the original ray 340 intersected with the object $320_A$, and may traverse in a direction towards the light source $325_B$. In this example, the path of the shadow ray $341_B$ is blocked by an object $320_D$. If the object $320_D$ is opaque, then the light source $325_B$ will not illuminate the object $320_A$ at the point where the original ray 340 intersected the object $320_A$. However, if the object $320_D$ which the shadow ray is translucent or transparent the light source $325_B$ may illuminate the object $320_A$ at the point where the original ray 340 intersected the object $320_A$.

Another type of secondary ray is a transmitted ray. A transmitted ray may be issued by the image processing system if the object with which the original ray intersected has transparent or translucent properties (e.g., glass). A transmitted ray traverses through the object at an angle relative to the angle at which the original ray struck the object. For example, transmitted ray 344 is seen traversing through the object $320_A$ which the original ray 340 intersected.

Another type of secondary ray is a reflected ray. If the object with which the original ray intersected has reflective properties (e.g. a metal finish), then a reflected ray will be issued by the image processing system to determine what color or light may be reflected by the object. Reflected rays traverse away from the object at an angle relative to the angle at which the original ray intersected the object. For example, reflected ray 343 may be issued by the image processing system to determine what color or light may be reflected by the object $320_A$ which the original ray 340 intersected.

The total contribution of color and light of all secondary rays (e.g., shadow rays, transmitted rays, reflected rays, etc.) will result in the final color of the pixel through which the original ray passed.

An Exemplary Kd-Tree

One problem encountered when performing ray tracing is determining quickly and efficiently if an issued ray intersects any objects within the scene to be rendered. One methodology known by those of ordinary skill in the art to make the ray intersection determination more efficient is to use a spatial index. A spatial index divides a three-dimensional scene or world into smaller volumes (smaller relative to the entire three-dimensional scene) which may or may not contain primitives. An image processing system can then use the known boundaries of these smaller volumes to determine if a ray may intersect primitives contained within the smaller volumes. If a ray does intersect a volume containing primitives, then a ray intersection test can be run using the trajectory of the ray against the known location and dimensions of the primitives contained within that volume. If a ray does not intersect a particular volume, then there is no need to run ray-primitive intersection tests against the primitives contained within that volume. Furthermore, if a ray intersects a bounding volume which does not contain primitives then there is no need to run ray-primitive intersections tests against that bounding volume. Thus, by reducing the number of ray-primitive intersection tests which may be necessary, the use of a spatial index greatly increases the performance of a ray tracing image processing system. Some examples of different spatial index acceleration data structures are octrees, k dimensional Trees (kd-Trees), and binary space partitioning trees (BSP trees). While several different spatial index structures exist, for ease of describing embodiments of the present invention, a kd-Tree will be used in the examples to follow. However, those skilled in the art will readily recognize that embodiments of the invention may be applied to any of the different types of spatial indexes.

A kd-Tree uses axis aligned bounding volumes to partition the entire scene or space into smaller volumes. That is, the kd-Tree may divide a three dimensional space encompassed by a scene through the use of splitting planes which are parallel to known axes. The splitting planes partition a larger space into smaller bounding volumes. Together the smaller bounding volumes make up the entire space in the scene. The determination to partition (divide) a larger bounding volume into two smaller bounding volumes may be made by the image processing system through the use of a kd-tree construction algorithm.

One criterion for determining when to partition a bounding volume into smaller volumes may be the number of primitives contained within the bounding volume. That is, as long as a bounding volume contains more primitives than a predetermined threshold, the tree construction algorithm may continue to divide volumes by drawing more splitting planes. Another criterion for determining when to partition a bounding volume into smaller volumes may be the amount of space contained within the bounding volume. Furthermore, a decision to continue partitioning the bounding volume may also be based on how many primitives may be intersected by the plane which creates the bounding volume.

The partitioning of the scene may be represented by a binary tree structure made up of nodes, branches and leaves. Each internal node within the tree may represent a relatively large bounding volume, while the node may contain branches to sub-nodes which may represent two relatively smaller partitioned volumes resulting after a partitioning of the relatively large bounding volume by a splitting plane. In an axis-aligned kd-Tree, each internal node may contain only two branches to other nodes. The internal node may contain branches (i.e., pointers) to one or two leaf nodes. A leaf node is a node which is not further sub-divided into smaller volumes and contains pointers to primitives. An internal node may also contain branches to other internal nodes which are further sub-divided. An internal node may also contain the information needed to determine along what axis the splitting plane was drawn and where along the axis the splitting plane was drawn.

Exemplary Bounding Volumes

Figure 4A:
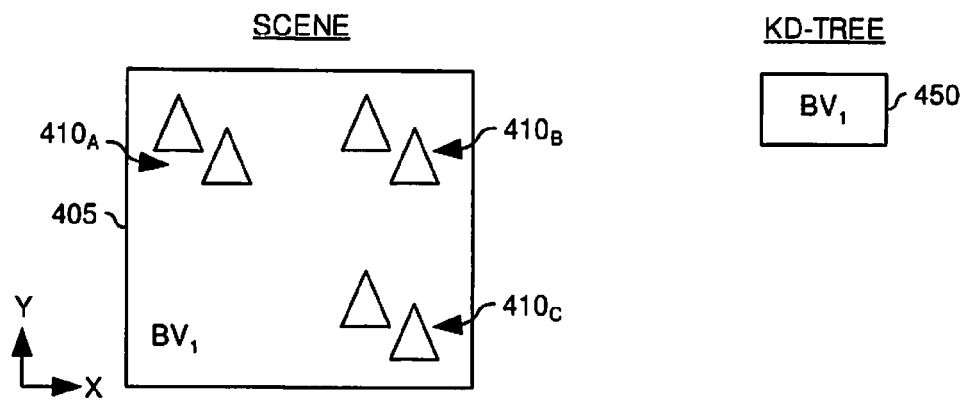
FIGS. 4A-4C illustrate a two dimensional space to be rendered by an image processing system and a corresponding spatial index created by an image processing system, according to one embodiment of the invention.
Figure 4B:
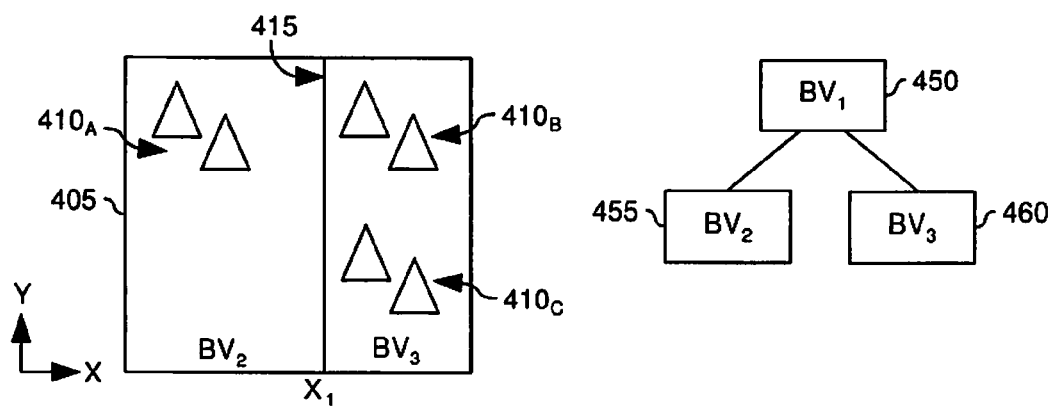
Figure 4C:
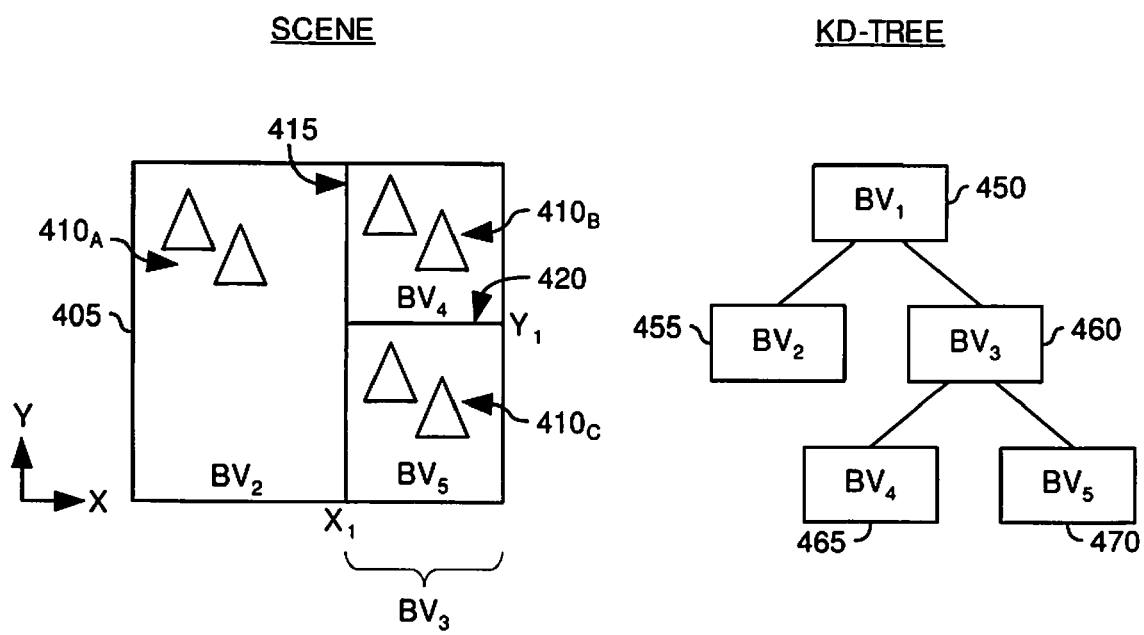

FIGS. 4A-4C illustrate a two dimensional space to be rendered by an image processing system and a corresponding kd-tree. For simplicity, a two dimensional scene is used to illustrate the building of a kd-Tree, however kd-Trees may also be used to represent three dimensional scenes. In the two dimensional illustration of FIGS. 4A-4C splitting lines are illustrated instead of splitting planes, and bounding areas are illustrated instead of bounding volumes as would be used in a three dimensional structure. However, one skilled in the art will quickly recognize that the concepts may easily be applied to a three dimensional scene containing objects.

FIG. 4A illustrates a two dimensional scene 405 containing primitives 410 to be rendered in the final picture to be displayed on a monitor 310. The largest volume which represents the entire volume of the scene is encompassed by bounding volume 1 ($BV_1$). In the corresponding kd-Tree this may be represented by the top level node 450, also known as the root or world node. In one embodiment of an image processing system, an image processing system may continue to partition bounding volumes into smaller bounding volumes when the bounding volume contains, for example, more than two primitives. As noted earlier the decision to continue partitioning a bounding volume into smaller bounding volumes may be based on many factors, however for ease of explanation in this example the decision to continue partitioning a bounding volume is based only on the number of primitives. As can be seen in FIG. 4A, $BV_1$ contains six primitives, therefore kd-Tree construction algorithm may partition $BV_1$ into smaller bounding volumes.

FIG. 4B illustrates the same two dimensional scene 405 as illustrated in FIG. 4A. However, in FIG. 4B the tree construction algorithm has partitioned $BV_1$ into two smaller bounding volumes $BV_2$ and $BV_3$. The partitioning of $BV_1$, was accomplished, by drawing a splitting plane $SP_1$ 415 along the x-axis at point $x_1$. This partitioning of $BV_1$ is also reflected in the kd-Tree as the two nodes 455 and 460, corresponding to $BV_2$ and $BV_3$ respectively, under the internal or parent node $BV_1$ 450. The internal node representing $BV_1$ may now store information such as, but not limited to, pointers to the two nodes beneath $BV_1$ (e.g., $BV_2$ and $BV_3$), along which axis the splitting plane was drawn (e.g., x-axis), and where along the axis the splitting plane was drawn (e.g., at point $x_1$).

The kd-Tree construction algorithm may continue to partition bounding volume $BV_3$ because it contains more than the predetermined threshold of primitives (e.g., more than two primitives). However, the kd-Tree construction algorithm may not continue to partition bounding volume $BV_2$, because bounding volume $BV_2$ contains less than or equal to the number of primitives (e.g., only two primitives $410_A$). Nodes which are not partitioned or sub-divided any further, such as $BV_2$, are referred to as leaf nodes.

FIG. 4C illustrates the same two dimensional scene 405 as illustrated in FIG. 4B. However, in FIG. 4C the kd-Tree construction algorithm has partitioned $BV_3$ into two smaller bounding volumes $BV_4$ and $BV_5$. The kd-construction algorithm has partitioned $BV_3$ using a partitioning plane along the y-axis at point $y_1$. Since $BV_3$ has been partitioned into two sub-nodes it may now be referred to as an internal node. The partitioning of $BV_3$ is also reflected in the kd-Tree as the two leaf nodes 465 and 470, corresponding to $BV_4$ and $BV_5$ respectively. $BV_4$ and $BV_5$ are leaf nodes because the volumes they represent are not further divided into smaller bounding volumes. The two leaf nodes, $BV_4$ and $BV_5$, are located under the internal node $BV_3$ which represents the bounding volume which was partitioned in the kd-Tree.

The internal node representing $BV_3$ may store information such as, but not limited to, pointers to the two leaf nodes (i.e., $BV_4$ and $BV_5$), along which axis the splitting plane was drawn (i.e., y-axis), and where along the axis the splitting plane was drawn (i.e., at point $y_1$).

The kd-Tree construction algorithm may now stop partitioning the bounding volumes because all bounding volumes located within the scene contain less than or equal to the maximum predetermined number of primitives which may be enclosed within a bounding volume. The leaf nodes may contain pointers to the primitives which are enclosed within the bounding volumes each leaf represents. For example, leaf node $BV_2$ may contain pointers to primitives $410_A$, leaf node $BV_4$ may contain pointers to primitives $410_B$, and leaf node $BV_5$ may contain pointers to primitives $410_C$.

A ray tracing image processing system may use the workload manager 205 to traverse the spatial index (kd-Tree). Traversing the kd-Tree may include selecting a branch to a node on a lower level (sub-node) of the kd-Tree to take or proceed to in order to determine if the ray intersects any primitives contained within the sub-node. A workload manager 205 may use the coordinates and trajectory of an issued ray to traverse or navigate through the kd-Tree. By executing ray-bounding volume intersection tests, the workload manager 205 may determine if the ray intersects a plane of the bounding volumes represented by nodes within the kd-Tree structure. If the ray intersects a bounding volume which contains only primitives (i.e., a leaf node), then the workload manager 205 may send the ray and associated information to a vector throughput engine 210 for ray-primitive intersection tests. A ray-primitive intersection test may be executed to determine if the ray intersects the primitives within the bounding volume. This methodology results in fewer ray-primitive intersection tests needed to determine if a ray intersects an object within the scene, in comparison to running ray-primitive intersection tests for a ray against each primitive contained within the scene.

The resulting kd-Tree structure, or other spatial index structure, may be stored in a processor cache 230. The kd-Tree and the size of corresponding data which comprises the kd-Tree may be optimized for storage in a processor cache 230. The storage of the kd-Tree in a processor cache 230 may allow a workload manager 205 to traverse the kd-Tree with a ray that has been issued by the image processing system without having to retrieve the kd-Tree from memory every time a ray is issued by the image processing system.

Dynamic Tree Traversal Reallocation

In a first and normal operating state of the image processing system, a workload manager 205 having a plurality of processing threads may be responsible for traversing a spatial index until a leaf node is reached. Furthermore, in the first operating state a vector throughput engine 210 having a plurality of processing threads may be responsible for determining if a ray hits a primitive contained within the leaf node. However, at times, the workload manager 205 may experience an increase in workload. In some circumstances, the increase in workload may be to such a degree that the workload manager 205 may not be able to traverse the spatial index at a rate acceptable for image processing purposes. In response to these circumstances, the image processing system may reallocate the responsibility of traversing portions of the spatial index to other processing elements (e.g., vector throughput engine). This reallocation may allow traversal of the spatial index at a rate acceptable for image processing purposes. The functionality of the image processing system after the reallocation of spatial index traversal responsibility may be referred to as a second operating state.

Figure 5:
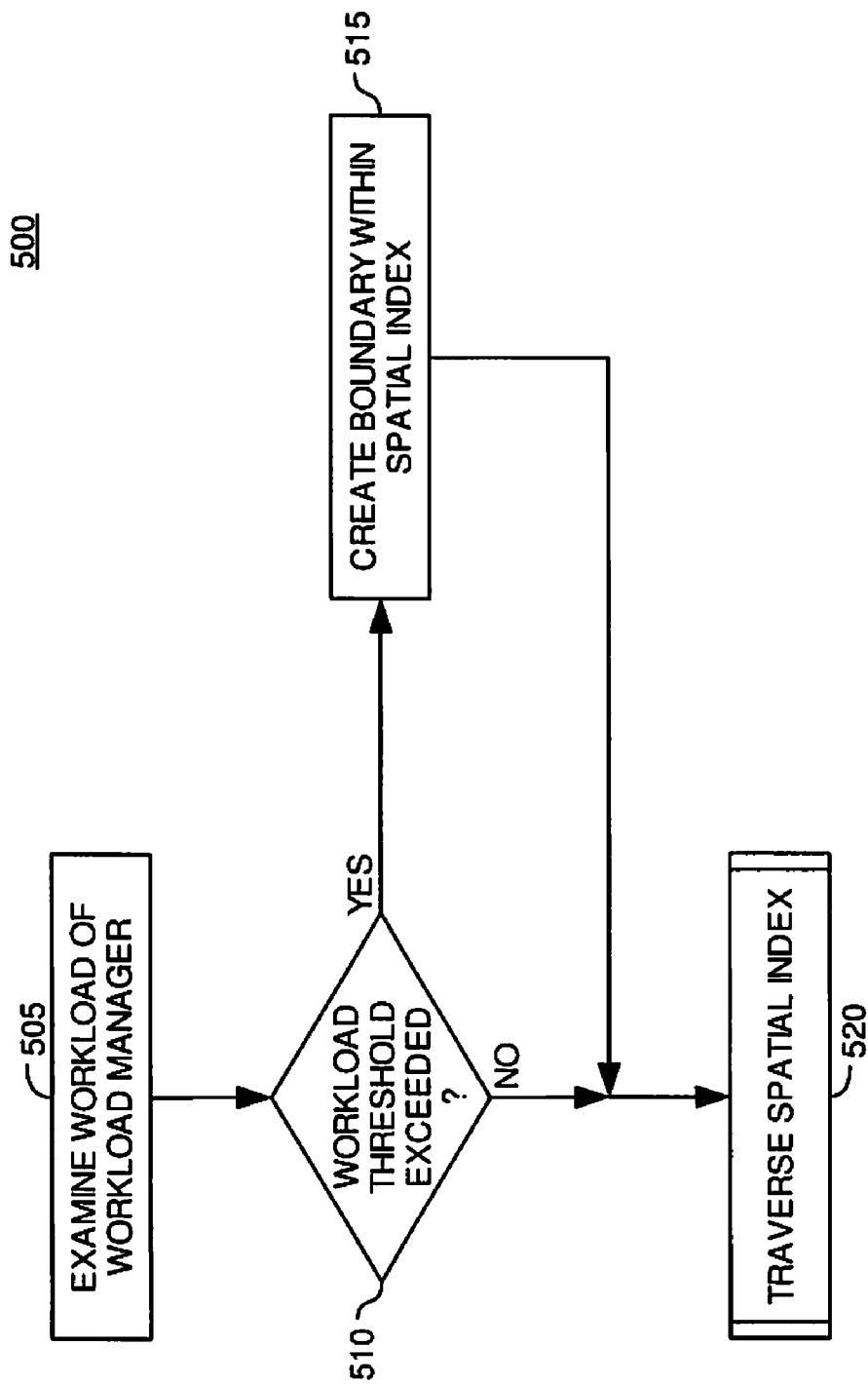
FIG. 5 is a flowchart illustrating a method of examining a workload of a processing element and responding to an increase in workload of the processing element, according to one embodiment of the invention.

FIG. 5 is a flowchart illustrating a method 500 for examining the workload of a workload manager 205 and for reallocating (if necessary) spatial index traversal responsibilities, according to one embodiment of the invention. The method 500 begins at step 505 where the image processing system may examine the present workload of the workload manager 205.

The amount of workload a workload manager 205 is experiencing may be detected or predicted, for example, by observing the number of rays issued by the image processing system. A change in the workload of a workload manager 205 may be caused by a number of factors. For example, an increased workload may be attributed to the image processing system issuing a relatively large number of rays to be traversed through the spatial index.

Next, at step 510, the image processing system may determine if the workload exceeds a predetermined or dynamic threshold. The threshold may be chosen such that if it is not exceeded, the workload manager will be able to traverse the spatial index at a rate necessary for acceptable image processing. The threshold may also be chosen such that if it is exceeded, the workload manager 205 alone will not be able to traverse the spatial index at a rate necessary for acceptable image processing.

According to other embodiments of the invention, the workload experienced by other processing elements (e.g., vector throughput engine) may be assessed. Furthermore, based on the assessment of other processing elements the image processing system may reallocate the responsibility of traversing portions of the spatial index amongst different processing elements in order to achieve the most efficient spatial index traversal.

If the determination in step 510 is that the current workload being experienced by the workload manager does not exceed the threshold, the workload manager may be responsible for traversing rays through the entire spatial index until a leaf node is reached and the image processing system may continue on to step 520. However, if the present workload being experienced by the workload manager 205 exceeds the threshold, the image processing system may proceed to step 515.

According to an embodiment of the invention, in order to alleviate the increased workload on the workload manager 205, at step 515 the image processing system may reallocate the responsibility for traversing portions of the spatial index. This may be accomplished by creating a boundary within the spatial index. The boundary may be used to determine where within the spatial index the workload manager 205 may cease traversing the spatial index and send the ray to a vector throughput engine 210. Upon reception of the ray, the vector throughput engine 210 may finish traversing the ray through the spatial index and perform ray-primitive intersection tests once a leaf node is reached.

The location of the boundary within the spatial index may be determined by the image processing system. The location of the boundary may be determined based on any number of factors including, but not limited to, the number of nodes which will be traversed by the workload manager 205 and the vector throughput engine 210 after the boundary is put in place. The boundary may result in a horizontal division of the spatial index or any other type of division of the spatial index.

Utilizing the vector throughput engine to perform a portion of the spatial index traversal may decrease the workload on the workload manager 205 (e.g., decrease the number of ray-bounding volume intersection tests). The reallocation of workload may enable the image processing system to perform all tasks necessary render an image from a three dimensional scene (e.g., spatial index traversal, ray-primitive intersection tests, etc.) in an acceptable amount of time.

According to one embodiment of the invention, after reallocation of the spatial index traversal responsibilities, a first portion of the plurality of processing threads dedicated to the vector throughput engine 210 may be dedicated to traversal of a ray through the spatial index in the second operating state and a second portion of the vector throughput engine processing threads dedicated to performing ray-primitive intersection tests. The allocation of a portion of the vector throughput engine 210 processing threads to either traversal tasks or ray-primitive intersection tasks may provide a finer level of granularity when reallocating workload (e.g., in contrast to reallocating entire vector throughput engine processing cores).

Some time after reallocation, a determination may be made by the image processing system that the workload manager 205 may be able to once again traverse the entire spatial index at an acceptable rate. According to one embodiment of the invention, the image processing system may then remove the boundary from the spatial index (i.e., return to the first operating state of the image processing system). In contrast, some time after the reallocation of the spatial index traversal responsibility, a determination could be made that the workload manager 205 is experiencing a further increase in workload. According to one embodiment of the invention, the image processing system may create a second boundary such that other processing elements (e.g., other vector throughput engines) are responsible for traversing a third portion of the spatial index. Thus, the workload on the workload manager 205 is further reduced.

After the boundary or boundaries have been created in step 515 the image processing system may proceed to step 520 where the image processing system may begin traversing the spatial index.

Figure 6:
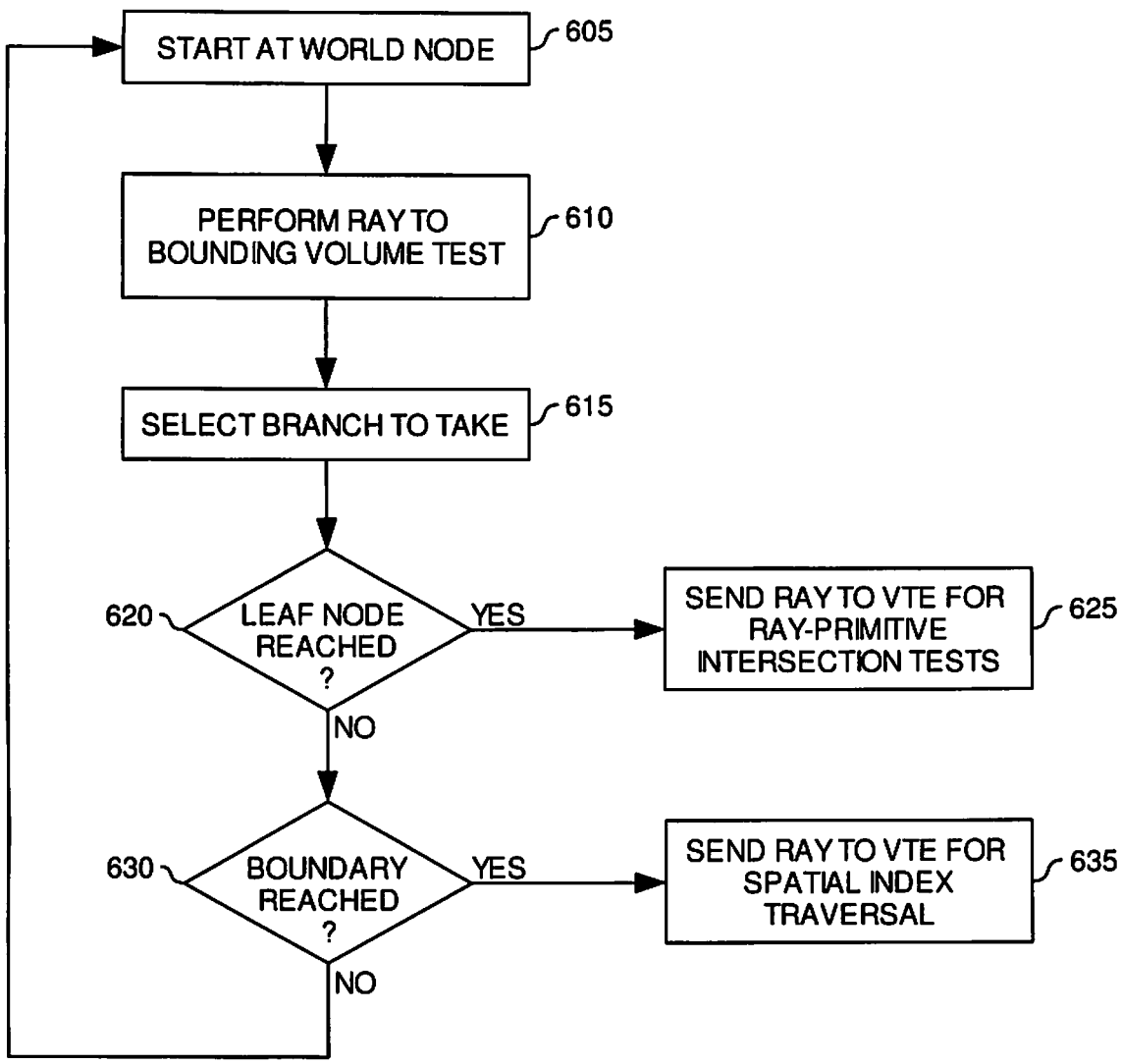
FIG. 6 is a flowchart illustrating a method of traversing a spatial index, according to one embodiment of the invention.

FIG. 6 illustrates a method 600 for traversing a spatial index, according to one embodiment of the invention. The method 600 commence at step 605, for example, when the image processing system issues a ray to a processing element (e.g., a workload manager 205) for traversal through a spatial index. At step 605, the workload manager 205 may begin traversing the spatial index with the ray at the world node of the spatial index. The workload manager may perform ray-bounding volume intersection tests to determine if the ray intersects either of the bounding volumes represented by the nodes directly beneath the world node. Based on the results of the ray-bounding volume intersection tests and other factors (e.g., ray trajectory) the workload manager 205 may, at step 615, select a branch to take to one of the nodes. Next, at step 620, the workload manager 205 may determine if the branch taken in step 615 resulted in a leaf node being reached. If so, the workload manager 205 may proceed to step 625 where the workload manager 205 may send the ray (via the inboxes 115 or the inboxes 115 and the high speed bus 225) to a second processing element (e.g., a vector throughput engine 210). The vector throughput engine 210 may then execute ray-primitive intersection tests to determine if the ray intersected any primitives contained within the bounding volume corresponding to the leaf node.

However, if at step 620 the workload manager 205 determined that a leaf node had not been reached the workload manager 205 may proceed to step 630. At step 630 the workload manager 205 may determine if a boundary has been reached. As described above with respect to FIG. 5, a boundary within the spatial index may exist within the spatial index when the image processing system is in a second operating state (e.g., the workload manager 205 is experiencing an increased workload). If a boundary has been reached, the workload manager 205 may proceed to step 635. At step 635 the workload manager 205 may send the ray to a second processing element (e.g., a vector throughput engine 210). The vector throughput engine 210 may then finish traversing the spatial index by performing ray-bounding volume intersection tests and selecting branches to take until a leaf node is reached. The vector throughput engine 210 may also execute ray-primitive intersection tests once it reaches a leaf node to determine if the ray intersected any primitives contained within the bounding volume corresponding to the leaf node.

However, if at step 630 the workload manager 205 determined that a boundary had not been reached, the workload manager 205 may return to step 610 to continue traversing the spatial index by performing ray-bounding volume intersections tests and selecting branches to take. Thus, the method 600 provides a technique for traversing a spatial index with either the workload manager 205 or the vector throughput engine 210.

Figure 7:
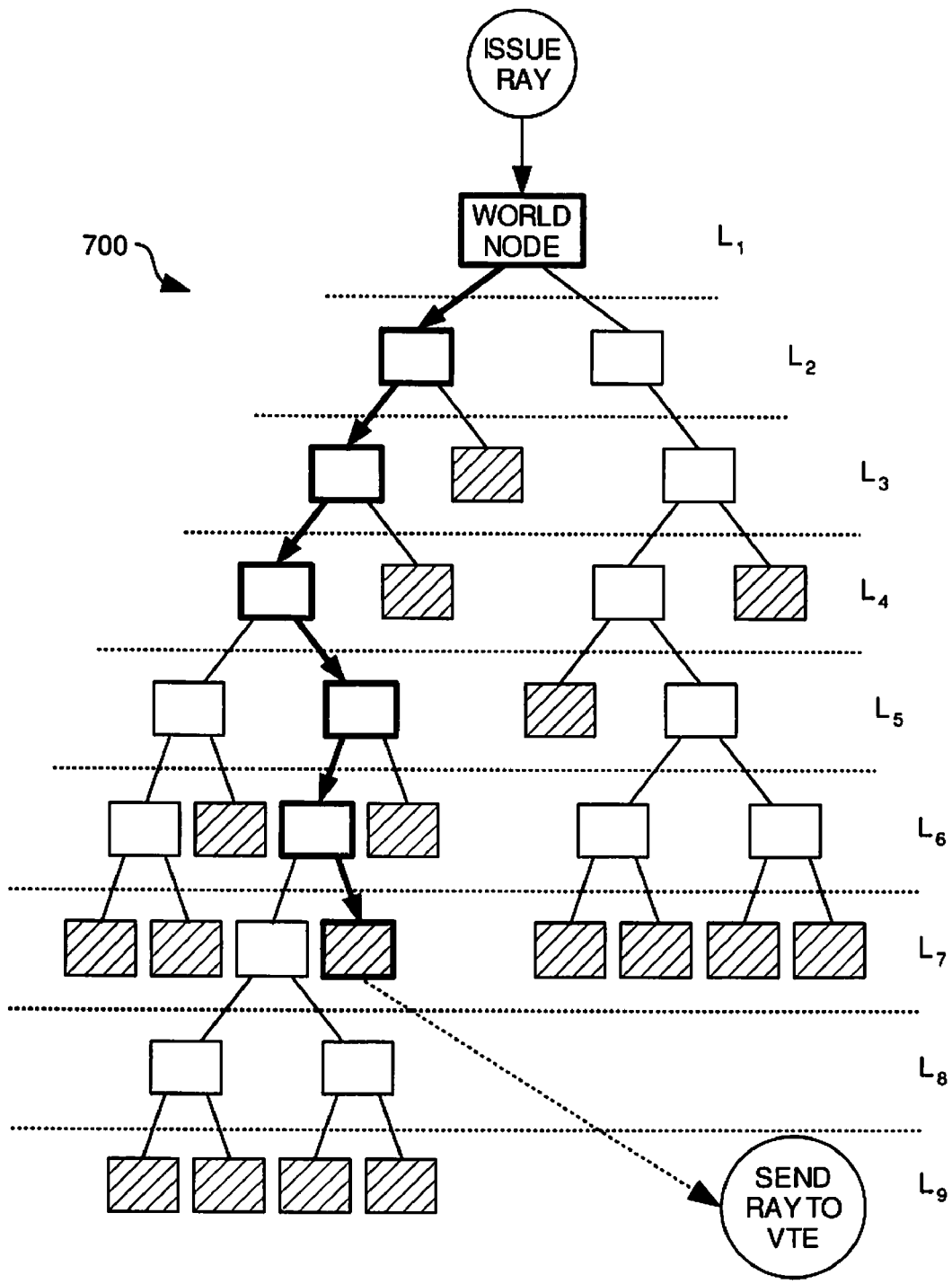
FIGS. 7 and 8 illustrate exemplary spatial indexes, according to one embodiment of the invention.

FIG. 7 illustrates an exemplary a spatial index 700 (i.e., a kd-tree). The kd-tree 700 in FIG. 7 has nine node levels containing thirty-four nodes. Of those thirty-four nodes seventeen are leaf nodes and seventeen are internal nodes. The leaf nodes of the kd-tree 700 are shaded for emphasis. As previously described, a leaf node may be a node which has no branches to other nodes (i.e., is not further divided into smaller bounding volumes). In contrast, internal nodes contain branches to other internal nodes or to leaf nodes.

FIG. 7 illustrates the traversal of a ray through the kd-tree 700 in a first and normal operating state by a workload manager 205. The branches taken and nodes encountered as the workload manager 205 traverses through the kd-tree 700 are emphasized in FIG. 7 with darkened outlines.

As described previously with respect to method 600, the workload manager 205 may commence traversing the kd-tree 700 when the image processing system issues a ray to the workload manager 205. The workload manager 205 may begin traversing the kd-tree 700 with the ray at the world node. The workload manager 205 may continue traversing the kd-tree 700 until a leaf node is encountered. The traversal path for the exemplary ray used in this example is illustrated in FIG. 7 by the darkened outlines of branches and nodes. As illustrated in FIG. 7 the workload manager 205 encounters a leaf node on the seventh level of the kd-tree 700. In the first operating state the workload manager 205 may then send the ray (via the inboxes 115 or the inboxes 115 and the high speed bus 225) to a vector throughput engine 210. At this point, the vector throughput engine 210 may execute ray-primitive intersection tests to determine if the ray intersected any primitives contained within the bounding volume defined by the leaf node.

Figure 8:
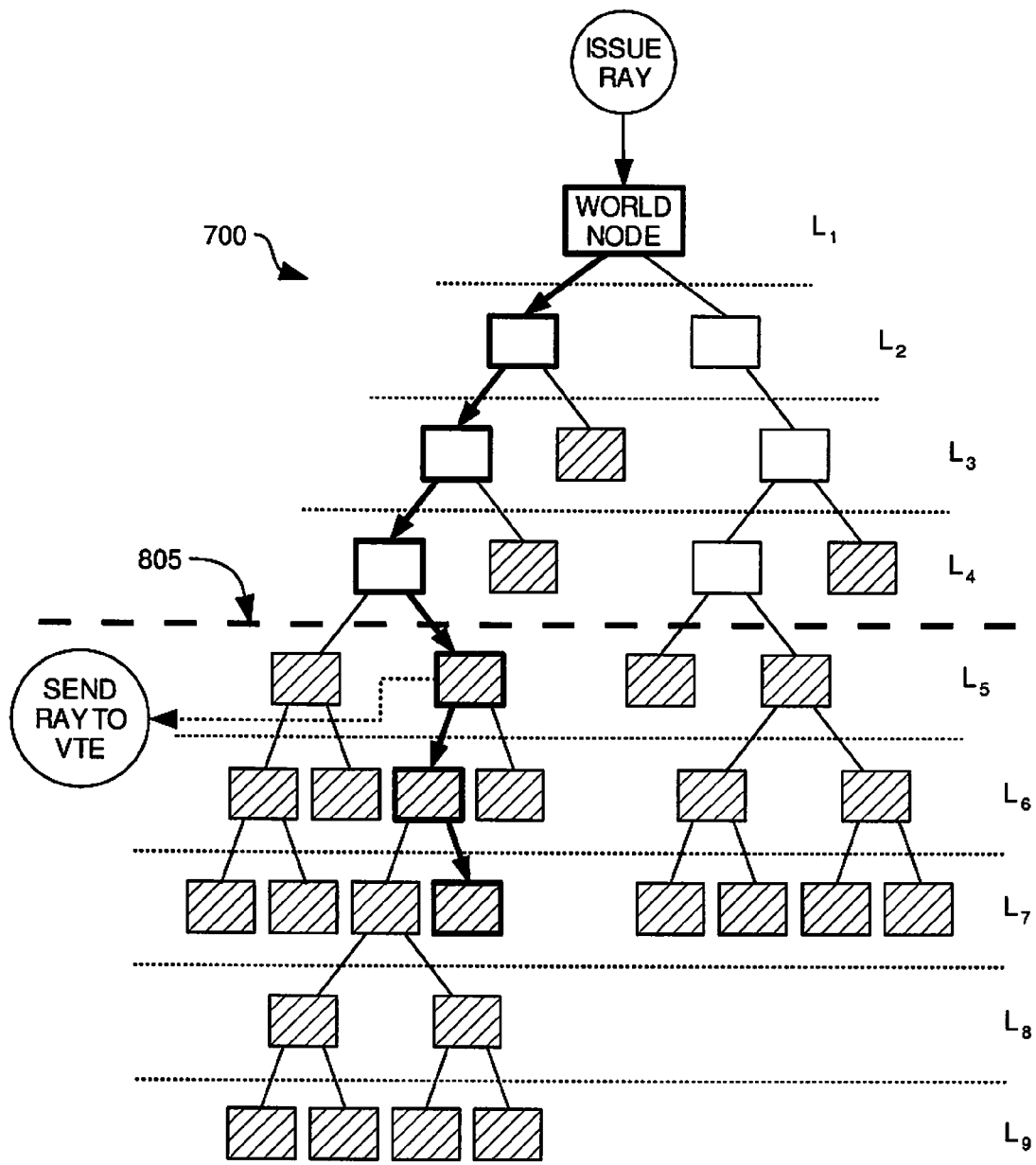

In contrast, during an increased workload state (a second operating state), the workload manager 205 may traverse the kd-tree 700 until a leaf node is reached or until a boundary is reached. For example, as illustrated in FIG. 8 a boundary 805 divides the kd-tree 700 between the fourth level and the fifth level.

In this example, the kd-tree 700 and the ray are the same as the example given above with respect to FIG. 7. The workload manager 205 may commence traversing the kd-tree 700 when the ray manager issues the ray. The workload manager 205, may begin traversing the kd-tree 700 at the world node. The workload manager 205 may continue traversing the ray through the kd-tree 500, as is illustrated by the darkened branches and nodes in FIG. 8.

However, in contrast to the first operating state, in the second operating state the workload manager 205 may encounter the boundary 805. At this point the workload manager 205 may send the ray to the vector throughput engine 210. The vector throughput engine 210 may then finish traversing the ray through the kd-tree 700 from the fifth level of the kd-tree 700 until a leaf node is reached. As illustrated in FIG. 8, a leaf node is reached on the seventh level of the spatial index 700. After the vector throughput engine 210 has reached a leaf node, the vector throughput engine 210 may execute ray-primitive intersection tests to determine if the ray intersects a primitive contained within the bounding volume corresponding to the leaf node.

CONCLUSION

In conclusion, the responsibility for traversing a spatial index may be reallocated during periods of increased workload. In a first operating state a workload manager may be experiencing a first or a normal workload. In the first operating state the workload manager may be responsible for traversing the entire spatial index and a vector throughput engine may be responsible for performing ray-primitive intersection tests. In an increased workload state the workload manager may experience an increased workload such that an increase in processing time necessary to render an image from a three dimensional scene occurs. In response to the increased workload the image processing system may partition the spatial index such that the workload manager may be responsible for traversing a first portion of the spatial index and the vector throughput engine may be responsible for traversing a second portion of the spatial index and for performing ray-primitive intersection tests. Therefore, workload may be reallocated in the increased workload state such that an image may be rendered from a three dimensional scene in an acceptable amount of time.

While the foregoing is directed to embodiments of the present invention, other and further embodiments of the invention may be devised without departing from the basic scope thereof, and the scope thereof is determined by the claims that follow.

What is claimed is:

1. A method of ray tracing utilizing a spatial index having nodes defining bounded volumes of a three dimensional scene comprising:
configuring one or more processors to perform an operation, comprising:
generating a ray into the scene;
traversing the spatial index with a first processing element by taking branches from internal nodes until a leaf node is reached, wherein branches are taken based on whether the ray intersects bounding volumes defined by the nodes;
determining with a second processing element if the ray intersects a primitive contained within the bounding volume corresponding to the leaf node;
in response to detecting an increase in workload associated with the first processing element, creating a boundary within the spatial index to partition the spatial index into a first portion and a second portion, wherein the first portion is on a first side of the boundary and the second portion is one a second side of the boundary, and wherein the first processing element will traverse the first portion of the spatial index until at least one of a leaf node or the boundary is reached, and the second processing element will traverse the second portion of the spatial index until a leaf node is reached, and upon reaching a leaf node, the second processing element will determine if a ray intersects a primitive contained within a bounding volume corresponding to the leaf node; and
in response to detecting a further increase in workload associated with the first processing element, creating a second boundary to further partition the spatial index into at least the first portion, the second portion, and a third portion, wherein a third processing element will traverse the third portion of the spatial index until a leaf node is reached, and upon reaching the leaf node the third processing element will determine if a ray intersects a primitive contained within a bounding volume corresponding to the leaf node.

2. The method of claim 1, wherein creating a boundary within the spatial index to partition the spatial index into a first portion and a second portion comprises:
determining a number of nodes contained within the spatial index; and
creating the boundary such that the number of nodes contained within the first portion and the second portion are relatively equal.

3. The method of claim 1, wherein the first processing element and the second processing element are on different processing cores.

4. The method of claim 1, further comprising:
wherein the second processing element comprises a plurality of processing threads; and wherein a first portion of the plurality of processing threads will traverse the second portion of the spatial index until a leaf node is reached and a second portion of the plurality of processing threads will determine if the ray intersects a primitive contained within the bounding volume corresponding to the leaf node.

5. The method of claim 1, further comprising:
in response to detecting a decreasing in workload associated with the first processing element, removing the boundary such that the first processing element will traverse the spatial index by taking branches from internal nodes until a leaf node is reached, and the second processing element will determine if the ray intersects a primitive contained within the bounding volume corresponding to the leaf node.

6. A method of ray tracing utilizing a spatial index having nodes defining bounded volumes of a three dimensional scene comprising:
configuring one or more processors to perform an operation, comprising:
generating a ray into the scene;
traversing the spatial index with a first processing element by taking branches from internal nodes until a leaf node is reached, wherein branches are taken based on whether the ray intersects bounding volumes defined by the nodes;
determining with a second processing element if the ray intersects a primitive contained within the bounding volume corresponding to the leaf node;
in response to detecting an increase in workload associated with the first processing element, creating a boundary within the spatial index to partition the spatial index into a first portion and a second portion, wherein the first portion is on a first side of the boundary and the second portion is one a second side of the boundary, and wherein the first processing element will traverse the first portion of the spatial index until at least one of a leaf node or the boundary is reached, and the second processing element will traverse the second portion of the spatial index until a leaf node is reached, and upon reaching a leaf node, the second processing element will determine if a ray intersects a primitive contained within a bounding volume corresponding to the leaf node; and
in response to detecting a further increase in workload associated with the first processing element, creating a second boundary to further partition the spatial index into at least the first portion, the second portion, and a third portion, wherein a third processing element will traverse the third portion of the spatial index until a leaf node is reached, and upon reaching the leaf node the third processing element will determine if a ray intersects a primitive contained within a bounding volume corresponding to the leaf node, wherein the third processing element is located on a different processing core than the first processing element and the second processing element.

* * * * *